United States Patent [19]

Pfaffmann et al.

[11] Patent Number: 4,625,090

[45] Date of Patent: Nov. 25, 1986

[54] APPARATUS FOR INDUCTIVELY HEAT TREATING WORKPIECE BORE WALLS

[75] Inventors: George D. Pfaffmann, Farmington, Mich.; George M. Mucha, Parma Heights, Ohio

[73] Assignee: Park-Ohio Industries, Inc., Shaker Heights, Ohio

[21] Appl. No.: 720,001

[22] Filed: Apr. 4, 1985

Related U.S. Application Data

[62] Division of Ser. No. 615,225, May 30, 1984, Pat. No. 4,531,987.

[51] Int. Cl.$^4$ ............................ H05B 6/10; C21D 1/18
[52] U.S. Cl. .......................... 219/10.57; 219/10.49 R; 219/10.79; 148/150; 266/127; 266/129
[58] Field of Search .................... 219/10.57, 10.49 R, 219/10.67, 10.43, 10.79; 148/145, 146, 150, 152, 154; 266/123, 124, 127, 129, 134, 114

[56] References Cited

U.S. PATENT DOCUMENTS

| | | | |
|---|---|---|---|
| 2,295,272 | 9/1942 | Somes | 148/152 |
| 2,547,053 | 4/1951 | Somes | 148/152 |
| 2,752,470 | 6/1956 | Redmond et al. | 219/10.43 |
| 2,757,267 | 7/1956 | Brauer et al. | 219/10.73 |
| 3,619,540 | 11/1971 | Soworowski | 219/10.79 X |
| 3,674,247 | 7/1972 | Gillick | 266/127 |
| 4,375,997 | 3/1983 | Matz | 148/150 |
| 4,401,485 | 8/1983 | Novorsky | 148/150 |

Primary Examiner—Philip H. Leung
Attorney, Agent, or Firm—Body, Vickers & Daniels

[57] ABSTRACT

A method and apparatus of quench hardening to a desired depth the full axial extent of the wall surface, or selected portions of the wall surface, of an axially extending bore in an elongated workpiece wherein the bore has a selected uniform cross-sectional shape throughout the length thereof and is closed at one end, which method and apparatus involves providing an inductor with an outer shape generally matching but smaller than the cross-sectional shape of the bore to permit passage of the inductor through the bore, supporting the workpiece with the axis of the bore extending vertically and the open end facing downward, electrically energizing the inductor with a known frequency and at a selected power level, passing the energized inductor upwardly through the bore to inductively heat the wall surface of the bore progressively upwardly from the lower end thereof while progressively liquid quenching the wall surface immediately below the inductor during the upward passage thereof through the bore, and directing additional liquid quenching medium from the top of the inductor for impingement against the innermost end regions of the wall surface of the bore, at the limit of the upward passage of the inductor into the bore, to quench the innermost end regions of the bore wall surface above the reach of the progressive liquid quenching of such wall surface below the inductor when located in its limiting upward position in the bore.

20 Claims, 10 Drawing Figures

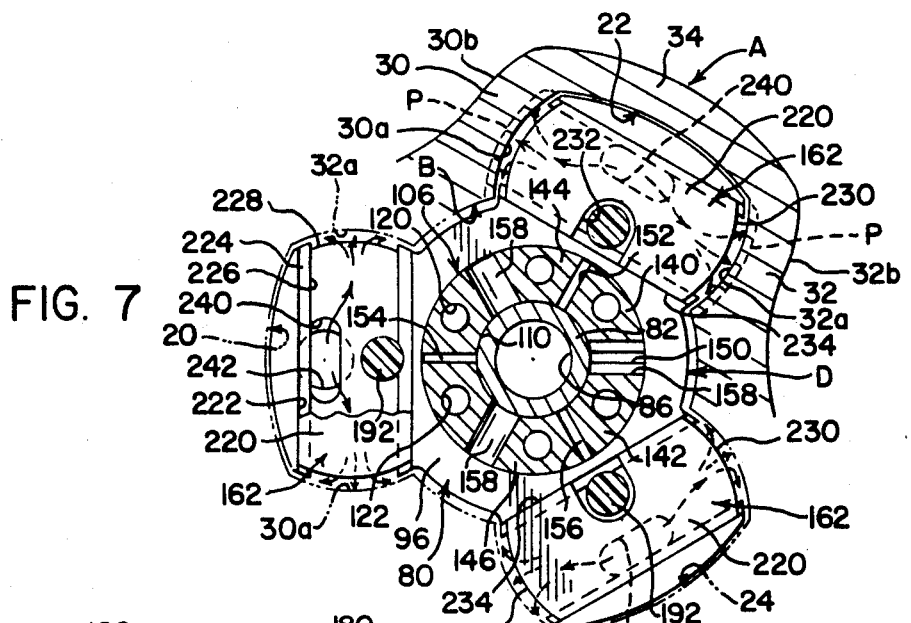
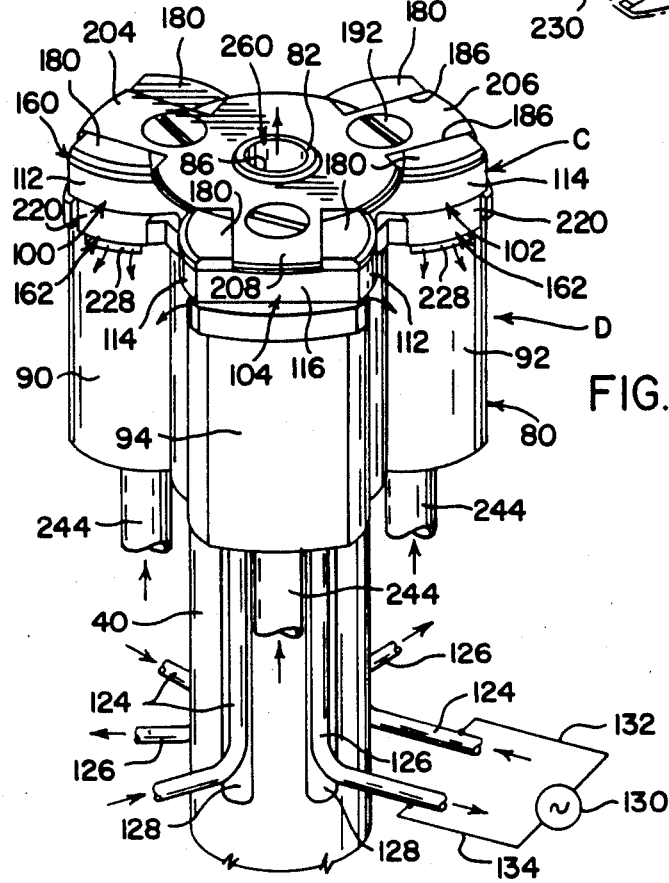
FIG. 7
FIG. 8

APPARATUS FOR INDUCTIVELY HEAT TREATING WORKPIECE BORE WALLS

This is a division, of application Ser. No. 615,225 filed May 30, 1984 now U.S. Pat. No. 4,531,987, issued July 30, 1985.

The present invention relates in general to the art of induction heating and more particularly to apparatus utilizing induction heating and liquid quenching to harden the wall surface of a bore which extends through an elongated workpiece and is closed at one end.

BACKGROUND OF THE INVENTION

The present invention is particularly applicable for inductively heating and quench hardening the full axial extent of a three-lobed internal bore or passage in a thin walled steel workpiece commonly known as a tripot housing used in the drive assembly of a front wheel drive vehicle and it will be described with particular reference thereto; however, the invention has broader applications and may be used for hardening the full axial extent of the wall surface of a bore irrespective of the profile or cross-sectional contour thereof and which extends within a workpiece and is open at one end but closed at its other end. Although the particular apparatus disclosed herein is designed to harden only selected axially extending segmental areas of the bore, it could be used as well to harden the total surface area of the bore.

It is well known to harden the wall surface of a bore open at both ends in a steel housing such as, for example, the wall surface of the three-lobed bore of the aforementioned tripot housing, by providing an inductor matching the three-lobed bore wall contour but generally slightly smaller in cross-sectional size than the bore to permit free passage of the inductor therethrough while establishing an inductive coupling gap between the inductor and the bore wall surface. With the housing supported with its bore extending vertically and the inductor supported in a position below the housing in alignment with the bore and energized by a high frequency electrical power supply, the inductor and housing are then moved vertically relative to one another to cause the energized inductor to pass upwardly through the bore and progressively inductively heat the bore wall surface upwardly along the length thereof from the open lower end of the bore. As the bore wall surface becomes thus progressively heated by the inductor to the selected depth, the heated wall surface is then progressively quenched to harden it by directing a quenching liquid thereagainst from a quench head located directly below the inductor and passing upwardly through the bore along with the inductor. The above described process for hardening the wall surface of an open ended three-lobed bore of a tripot housing, which is disclosed in U.S. Pat. No. 4,401,485 made of record herein, thus corresponds essentially to the standard practice employed heretofore for many years to harden the cylindrical wall surface of various open ended cylindrical bores in steel workpieces. In this latter case, moreover, it is also known to rotate the workpiece about the central axis of the cylindrical bore so that the progressing inductor and associated quench head act upon a rotating cylindrical surface to thereby provide uniform progressive heating and quench hardening of the cylindrical bore wall surface.

While the known workpiece bore wall hardening methods and apparatus as described above are entirely suitable for use where the bore is open at both ends, they are not suitable for use where the bore is open at only one end and either completely or partially closed off at its other end by an end wall of the workpiece housing, and where the bore wall is to be heated and quench hardened to substantially the inner or closed end of the bore. In such case, the end wall which closes the one end of the bore interferes with and limits upward passage of the inductor through and out of the upper end of the bore. As a result, the quench head, which is located below the inductor and which directs the quench liquid more or less laterally outward and ordinarily angled downwardly therefrom and against the bore wall, is restricted and prevented from passage through the bore completely to the inner end thereof. Thus, the quench liquid directed laterally outwardly from the quench head cannot reach and impinge against the heated innermost end portions of the bore wall located opposite and above the inductor in the limiting uppermost position of the latter in the bore, thus preventing the full completion of the bore wall hardening operation. Moreover, with such prior methods and apparatus, the innermost end portions of the bore wall are not inductively heated to the necessary depth at the end of the upward passage of the inductor into the bore so that, even if such innermost end portions of the bore wall were reached and quenched by the quench liquid, insufficient hardening of such innermost end portions of the bore wall nevertheless results.

SUMMARY OF THE INVENTION

The present invention contemplates an apparatus for surface hardening all or portions of the wall surface of a workpiece bore closed at one end and the surface hardening of which extends substantially to the closed end of the bore and is of adequate depth throughout the full axial extent thereof.

Briefly stated, in accordance with one aspect of the invention there is provided, in addition to the conventional or, in this case, primary quench from a quench head located directly below the inductor, a secondary quench from a top quench discharging means located above the inductor and its associated support means and operative, after inductive heating of the uppermost inner end portions of the bore wall by the inductor is completed, to discharge a secondary flow of quench fluid out of and flooding over the top end of the inductor and its associated support means so as to impinge against and harden the heated uppermost inner end portions of the bore wall not reached by and hardened by the primary quench. Preferably, the quench fluid from the secondary quench is directed upwardly out the secondary quench opening at the top of the inductor and its associated support means and impinges against the adjacent closed end wall of the bore and is redirected thereby so as to flow radially outward of the bore and flood over the top of the inductor and its associated support means so as to impinge against the heated innermost end portions of the bore wall and thus harden such bore wall portions.

In accordance with a further aspect of the invention, the inductive heating of the bore wall by the inductor is continued for a short time interval, after the inductor first reaches its limiting uppermost position within the closed upper bore end, before the initiation of the secondary quench in order to thereby assure the inductive heating of the uppermost inner end portions of the bore wall to an adequate depth more or less corresponding to that of the rest of the bore wall before the start of quenching of such inner end portions of the bore wall by the secondary quench. This short time delay before the start of the secondary quench and continued inductive heating instead of the inner end portions of the bore wall by the inductor is necessitated, in part, by the heat sink effect of, and resulting heat withdrawal from the inductively heated inner end portions of the bore wall by, the unheated and relatively cool immediately contiguous closed end wall of the bore.

According to a still further aspect of the invention, the quench liquid for the secondary quench is conveyed to the top of the inductor and its support means through a vertical passageway extending centrally through the inductor support means and communicating at its lower end with a secondary quench liquid supply means.

The principal object of the invention is to provide a novel apparatus for hardening the full axial extent of the wall surface of an elongated bore extending into a metal workpiece and closed at one end by an end wall of the workpiece.

Another object of the invention is to provide a novel apparatus as referred to above for hardening the bore wall surface of a workpiece bore substantially up to the closed end of the bore and which utilizes induction heating of the bore wall surface preparatory to the quenching thereof to harden the same.

Still another object of the invention is to provide a novel apparatus as referred to above and which utilizes a progressive inductive heating and progressive primary quench of the inductively heated bore wall surface along with a secondary quench impinging against the heated inner end portions thereof to conjointly effect the hardening of the bore wall surface throughout substantially the full axial extent thereof.

A further object of the invention is to provide an apparatus as referred to above and which provides a quenching of the innermost end regions of the bore wall surface by a secondary quench only after they are heated to an adequate depth by the energized inductor of the apparatus.

A still further object of the invention is to provide a unitary inductor and quench head assembly for providing both a primary quench and a secondary quench directed outwardly from the assembly from respective outlets thereof located below and above the inductive heating element of the assembly.

Further objects and advantages of the invention will be apparent from the following detailed description of a preferred species thereof and from the accompanying drawings.

BRIEF DESCRIPTION OF THE DRAWINGS

In the drawings:

FIG. 7 is a horizontal sectional view taken on the line 7—7 of FIG. 4;

FIG. 8 is a pictorial view of the inductor and quench head assembly of the apparatus;

DESCRIPTION OF THE PREFERRED EMBODIMENT

Figure 6:
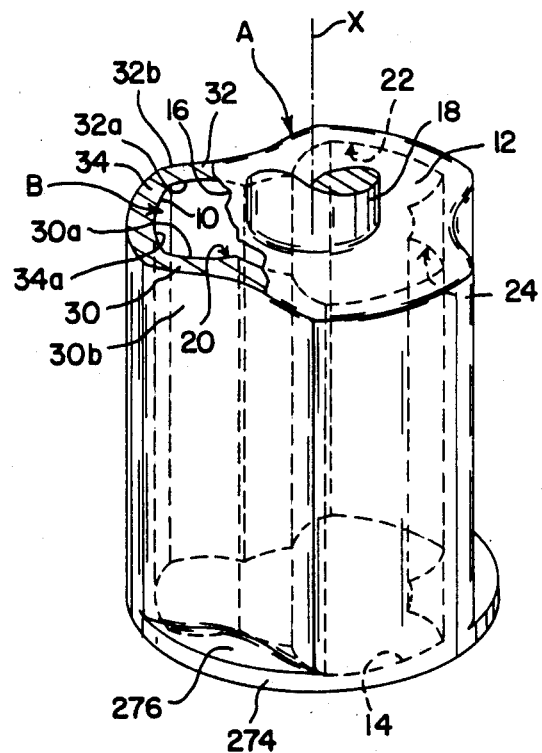
FIG. 6 is a pictorial view, shown partly broken away in section, of a tripot housing such as used in the front drive assembly of an automobile having a front wheel drive mechanism and the bore wall of which housing is to be hardened by the apparatus comprising the invention.

Referring now to the drawings wherein the showings are for the purpose of illustrating the preferred embodiment of the invention only and not for the purpose of limiting same, there is shown in FIG. 6 a so-called tripot housing or steel workpiece A of the type which the apparatus of the present invention is specially adapted to treat to effect the hardening of selected portions of the wall surface 10 of an elongated bore B in the housing having a closed end 12 and an open opposite end 14. Workpiece A is of elongated, thin walled form and has an end wall 16 forming the closure for the closed bore end 12 and provided with an endwise projecting cylindrical center shaft 18 extending coaxially with the central axis X of the housing A.

Figure 3:
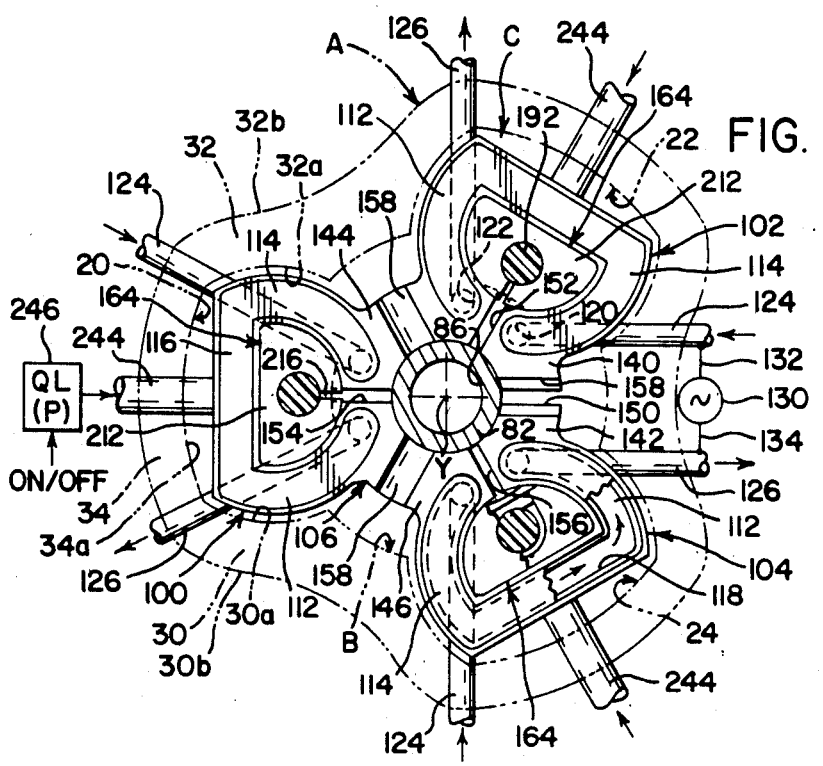
FIG. 3 is a horizontal sectional view on the line 3—3 of FIG. 1 showing on an enlarged scale the inductor and quench head assembly of the apparatus and with a tripot housing to be processed shown in phantom.

The elongated bore B is of uniform transverse cross-section throughout the bore length, which cross-section includes three equally spaced lobe sections 20, 22 and 24 therearound, as best shown in phantom in FIG. 3. These lobes make the bore B noncircular. However, the present invention is applicable as well to the wall hardening of a circular cross-sectional bore having a cylindrical wall surface of uniform diameter throughout the length of the bore. The lobe sections 20, 22 and 24 of the bores B are essentially identical in form and they are each defined by opposed side walls 30 and 32 spaced equally from and on opposite sides of the respective radial plane of each lobe section, and an arcuate outer end wall 34 joining the two side walls 30 and 32. All of the walls 30, 32 and 34 defining the lobe sections 20, 22 and 24 have essentially the same thickness. The opposed spaced side walls 30 and 32 of each lobe section are formed with inner facing surfaces 30a and 32a, respectively, which are of somewhat concave arcuate shape and are to be provided with hardness patterns P (FIG. 7) extending across the full arcuate extent of and generally along the entire axial extent of the arcuate surfaces 30a, 32a between the ends 12 and 14 of the bore B. The hardness patterns P thus extend in respective strips axially through the workpiece bore B along the walls 30, 32 thereof. The side walls 30, 32 defining each lobe section 20, 22, 24 also have outer surfaces 30b, 32b which are generally parallel to and spaced from inner surfaces 30a, 32a a distance at least approximately twice the thickness or depth of the hardness pattern P. The workpiece A may be made of SAE magnetic steel.

Figure 1:
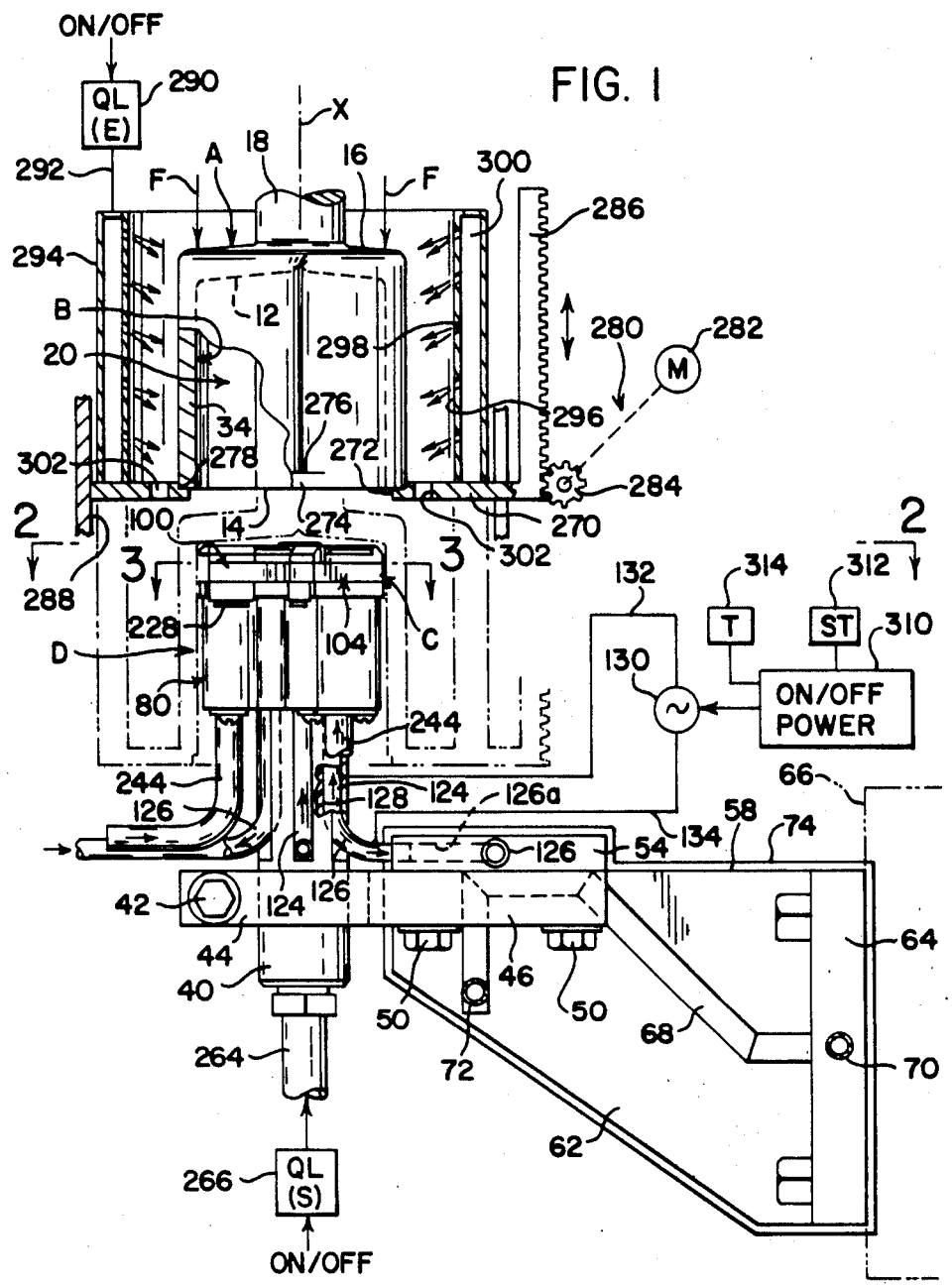
FIG. 1 is an elevational view, partly in section, of an apparatus according to the invention for hardening the wall surface of a workpiece bore having a closed end.
Figure 4:
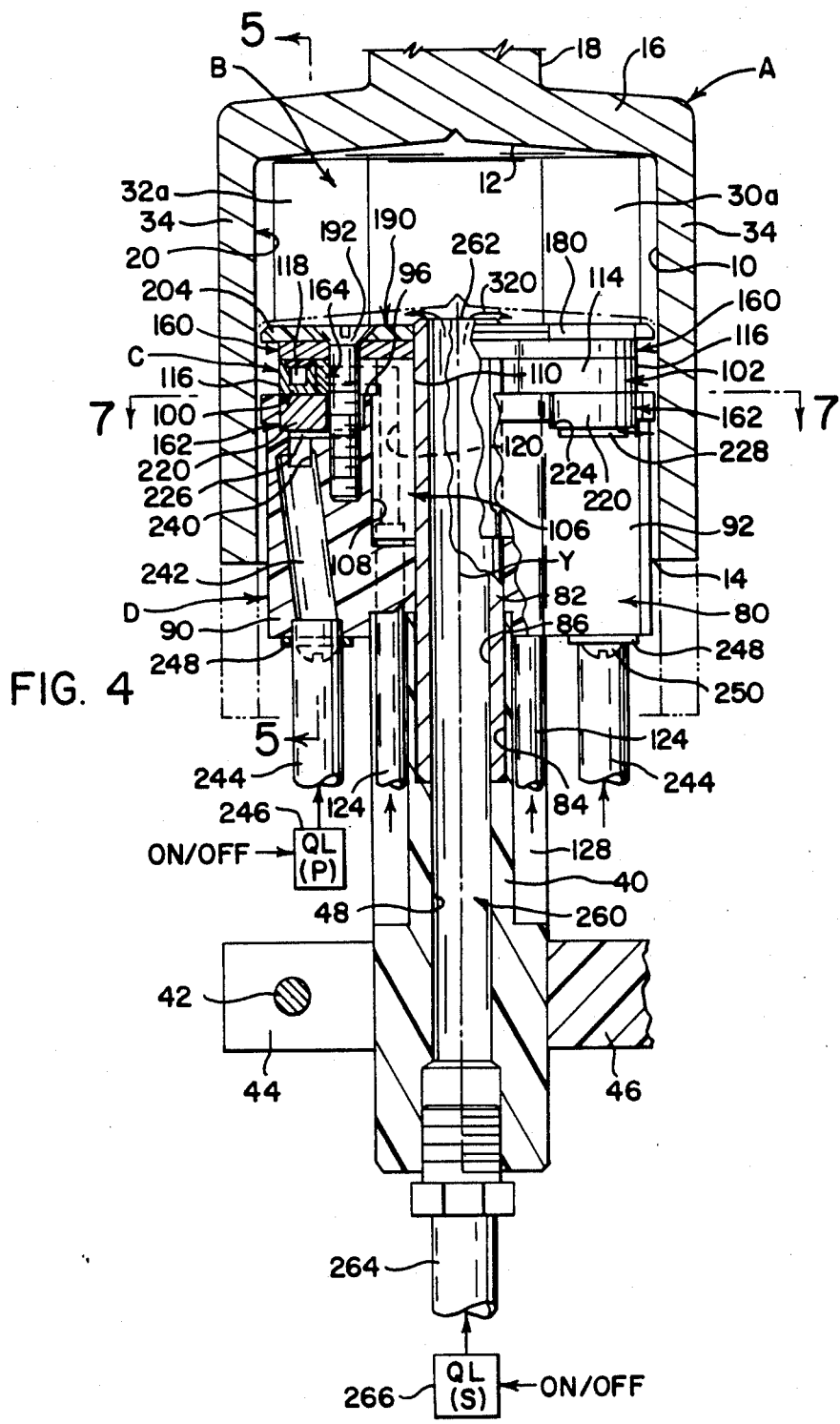
FIG. 4 is a vertical sectional view taken on the line 4—4 of FIG. 2 showing on an enlarged scale the inductor and quench head assembly along with a tripot housing being processed.

The present invention relates to apparatus for creating the hardness pattern P in the spaced inner surfaces 30a, 32a of the various lobe sections 20, 22 and 24 of the workpiece bore B. To this end, there is provided an inductor C forming a component part of a combination inductor and quench head assembly D (FIG. 8) which is adapted for passage through the workpiece bore B from the open end 14 thereof to its closed end 12. For this purpose, inductor assembly D is of an outer shape or configuration generally matching, but smaller than, the cross-sectional shape or contour of the workpiece bore B so as to permit the free passage of the assembly D through this bore. As best shown in FIGS. 1 and 4, assembly D is fixedly mounted and supported in place on the upper end of a vertically extending, indurated plastic, tubular support post or mandrel 40 upstanding from and securely clamped in position at its lower end, as by bolt 42, within a C-clamp end portion 44 of an indurated plastic clamp plate 46. The tubular mandrel 40 has an axial passageway 48 therethrough for the passage of quench fluid through the mandrel to the inductor and quench head assembly D.

Figure 10:
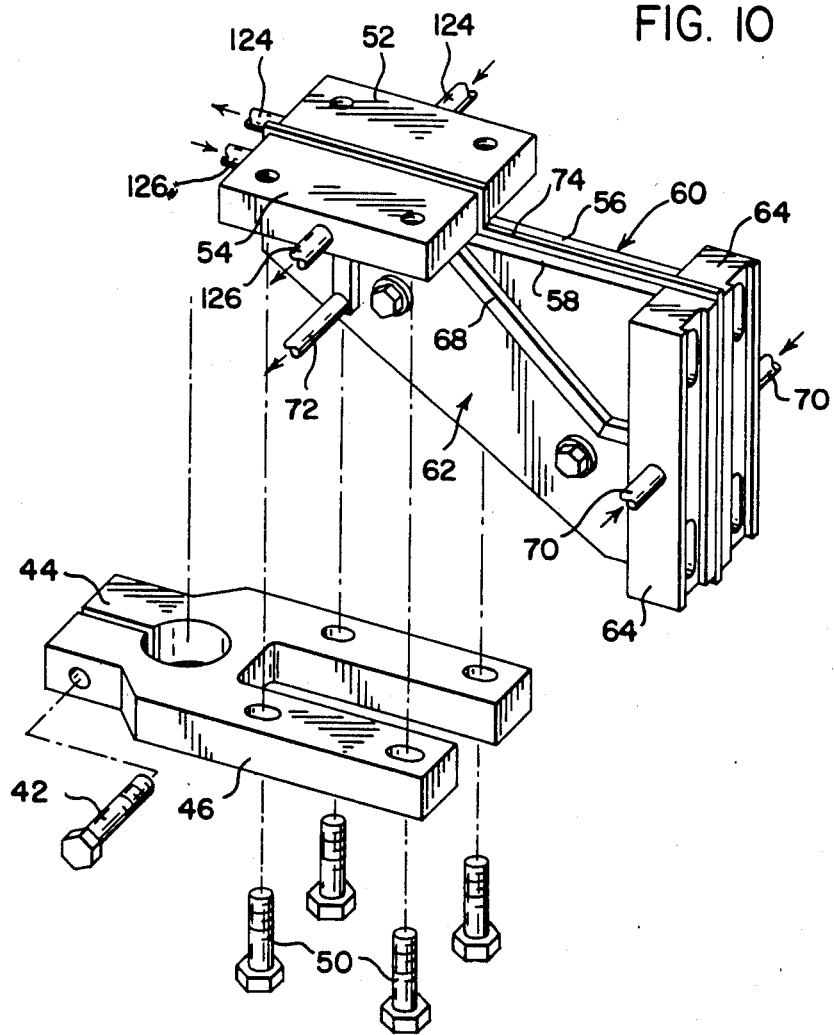

Clamp plate 46 is secured, as by bolts 50, to the underside of respective mounting plate portions 52, 54 made of copper and brazed to the upper horizontal edges 56 and 58 (FIG. 10) of respective electrically conductive plate-like bus members 60 and 62 of copper which serve to supply electrical power to the inductor C as well as to support the assembly D. Bus members 60, 62 are supported at corresponding block ends 64 thereof in spaced side-by-side and electrically insulated relation to each other, as by bolting to a suitable insulating support member 66. The bus members 60, 62 each have a flat-sided copper tube 68 brazed flatwise against their outward flat sides for passage of a liquid cooling medium therethrough to cool the bus members which become heated by the electrical current passing through these members during the energization of the inductor. The bus cooling tubes 68 are each connected at their opposite ends to copper inlet and outlet nipples 70 and 72, respectively, for the supply of the cooling medium to the tubes 68 from a suitable supply thereof and for the discharge of the cooling medium from these tubes. To assure the positive separation and electrical insulation of the spaced plate-like bus members 60, 62 from one another, a thin sheet 74 of electrical insulating material such as indurated plastic is interposed between these bus members.

Figure 9:
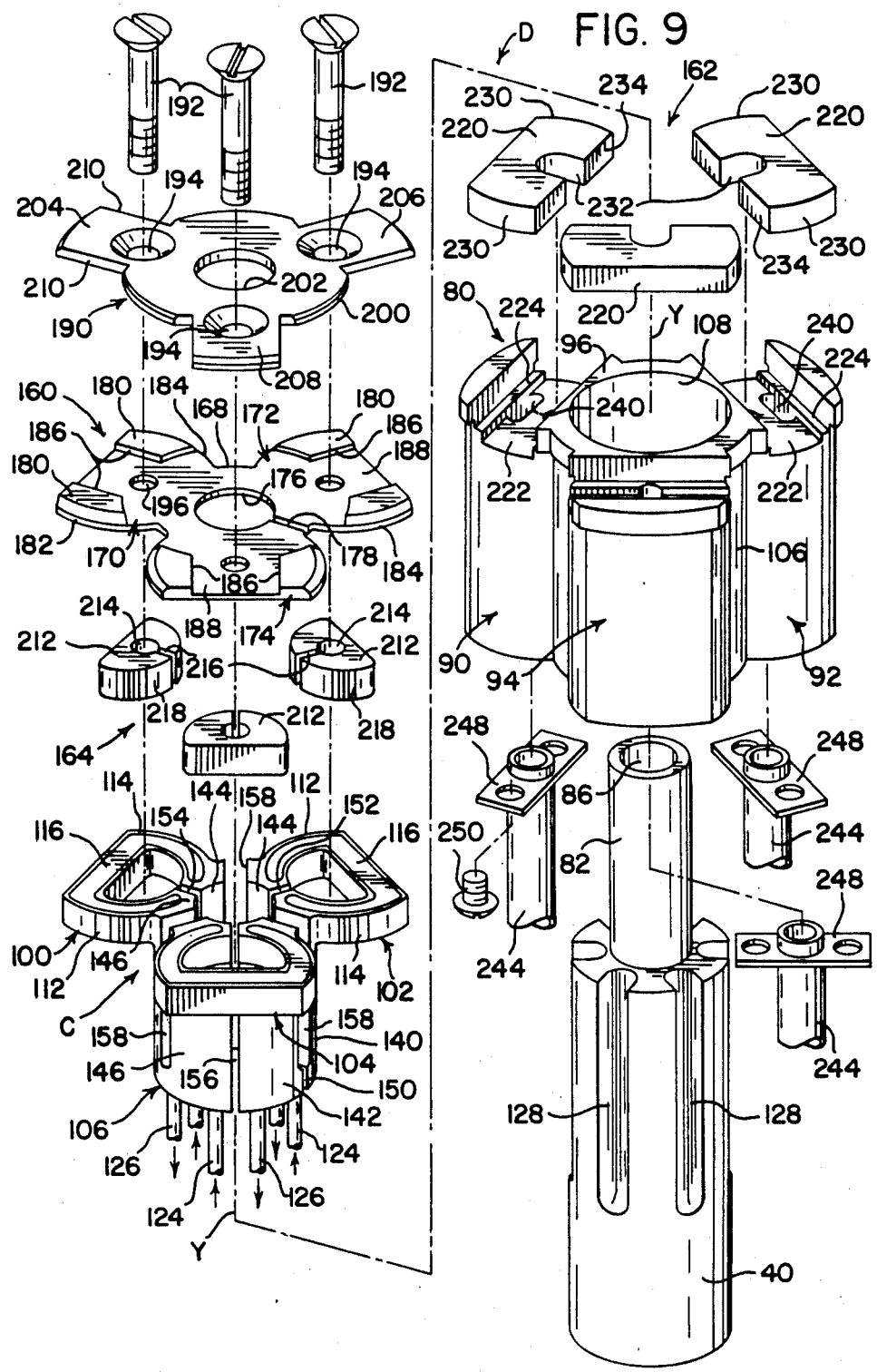
FIG. 9 is an exploded perspective view of the component parts comprising the inductor and quench head assembly; and, FIG. 10 is an exploded perspective view of the mounting support and power supply arrangement for the inductor and quench head assembly.

The inductor and quench head assembly D which, as referred to above, is mounted on the upper end of the upstanding hollow mandrel or center support post 40, comprises an indurated plastic support housing or so-called lower scuff cup 80 resting on the upper end of the center support post and supporting at its top end the inductor C. The cup member 80 surrounds and closely fits over a vertical extending cylindrical center tube 82 which is tightly secured as by epoxy cement within a counterbore 84 in the upper end of support post 40 and which, along with the axial passageway 86 of the tube, constitutes an upward extension of the support post and its axial passageway 48. The centering extension tube 82 is made of a material of high electrical resistivity such as bonded ferrite or that commercially known as ferrocon. The cup member 80 is formed with a three-lobed outer wall configuration, as best shown in FIGS. 7-9, generally matching but smaller than the cross-sectional shape or contour of the workpiece bore B so as to be freely movable therethrough. To this end, the cup member 80 is provided with three lobe portions 90, 92 and 94 projecting radially outwardly thereof and equally spaced apart therearound, i.e., spaced 120° apart around the commond center axis Y of the cup member and its supporting and centering tubes 40 and 82.

Resting on and clamped down against the flat upper end surface 96 of the insulating lower scuff cup member 80 is the inductor C. As best shown in FIGS. 3-5, 7 and 9, the inductor C is comprised essentially of three hollow induction heating or inductor loop elements 100, 102 and 104 formed of copper and brazed to the upper end of a generally hub-like copper sleeve member 106. The hub or sleeve member 106 extends downwardly into and is firmly fitted within an upwardly opening counterbore 108 at the upper end of the cup member 80 and is provided with an axial bore 110 through which the center tube 82 extends in tight fitting relation. The hub member 106 of the inductor C thus is coaxial with the axis Y of the center tube 82. The three inductor loop elements 100, 102 and 104 project radially outward from the upper end of the hub member 106 in equally spaced apart relation therearound, i.e., spaced 120° apart around the center axis Y of the hub member 106 and center tube 82, and they lie in a common transverse plane normal to the hub member axis. The inductor loop elements 100, 102 and 104 generally match the contour of, but are spaced inwardly from the corresponding inner surfaces 30a, 32a and 34a of the respective lobe sections 20, 22 and 24 of the workpiece bore B during the passage of the inductor and quench head assembly D axially therethrough. To this end, and as best shown in FIG. 3, each of the inductor loop elements 100, 102 and 104 is comprised of a pair of opposed arcuate side sections 112 and 114 brazed at their inner ends to the upper end of the inductor hub member 106 and interconnected at their outer ends by a straight outer end section 116 extending perpendicularly to the radial plane of the respective inductor loop elements 100, 102 and 104. The curved outer contour of the arcuate side sections 112 and 114 of the loop elements matches the arcuate curvature of the opposed arcuate inner side surfaces 30a and 32a of the respective workpiece bore lobe section 20, 22 or 24 but is spaced a slight distance, generally in the range of 0.030 to 0.040 inches or so, from these arcuate inner side surfaces 30a, 32a so as to produce the desired flux coupling between each inductor loop element 100, 102 and 104 and the bore side surfaces 30a and 32b during the passage of the inductor C, while energized, through the workpiece bore B. The straight outer end section 116, however, of each inductor loop element 100, 102, 104 is spaced a distance, from the inner surface 34a of the end wall 34 of the respective workpiece bore lobe section 20, 22 or 24, which is substantially greater than the coupling gap distance between the inductor loop arcuate side sections 112, 114 and the arcuate inner surfaces 30a, 32a of the workpiece bore lobe sections 20, 22, 24 such that the inductor loop elements 100, 102 and 104 do not inductively heat these inner surfaces 34a to a temperature sufficient for subsequent quench hardening thereof.

The inductor loop elements 100, 102 and 104 are in the form of copper tubes of approximately square cross-section providing a passageway 118 (FIG. 4) therethrough for the circulation of a liquid cooling medium through these elements which are normally heated by the electrical current passing therethrough during the energization of the inductor C. At their opposite ends where each inductor loop element 100, 102, 104 is joined to the top end of and supported by the hub member 106 of the inductor C, the internal cooling passageway 118 of each loop element communicates with vertical inlet and outlet passageways 120, 122, respectively, extending in an axial direction through the hub member 106 and connected at their lower ends to copper inlet and outlet tubes 124 and 126 which are brazed to the hub member and extend vertically through and project from the lower end of the plastic scuff cup member 80. The vertical portions of inlet and outlet tubes 124, 126 which project downwardly from the plastic scuff cup 80 fit snugly within vertical grooves 128 in the cylindrical outer surface of the mandrel or support post 40 to provide a stay or support guide for these tubes.

Figure 2:
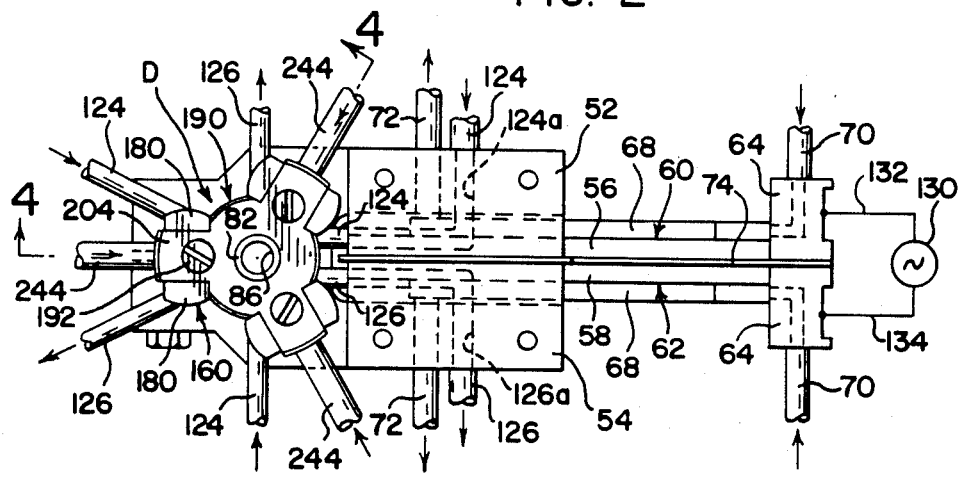
FIG. 2 is a plan view, on the line 2—2 of FIG. 1, of the apparatus there shown.

At their lower ends, the tubes 124, 126 are bent laterally outward and suitably connected to a supply (not shown) of cooling liquid for circulation through the inductor loop elements 100, 102 and 104. The bent lower ends of the coolant inlet tube 124 for inductor loop elements 102 and the coolant outlet tube 126 for inductor loop element 104 are connected, however, to the coolant supply through respective coolant passageways 124a and 126a (FIG. 2) in the mounting plate portions 52 and 54, respectively, of the bus members 60 and 62, as by being brazed into the opposite ends of these passageways. The coolant circulated through the passageways 124a and 126a, during the energization of the inductor C, thus serves to also cool the mounting plate portions 52 and 54 which are normally heated at such time by the electrical current which is directed therethrough, from a high frequency power source such as a motor generator (MG) set or inverter 130 and connecting leads 132, 134 to the bus members 60, 62, to effect the energization of the inductor C. The electrical current from the power supply 130 and passing through the mounting plate portions 52, 54 is then conducted therefrom to the inductor C through the coolant inlet tube 124 for inductor loop elements 102 and coolant outlet tube 126 for inductor loop element 104 and through the annularly separated arcuate segment portions 140 and 142 of the inductor hub member 106 to which segments these particular tubes 124 and 126 are respectively brazed.

The hub member 106 of inductor C is so constructed as to electrically interconnect the three inductor loop elements 100, 102 and 104 in a series circuit. To this end, and as best shown in FIGS. 3, 7 and 9, the hub member 106 is split or divided into four annularly separated arcuate segments including the aforementioned segments 140, 142 and two other segments 144, 146, by a plurality of axially extending splits or dividing gaps 150, 152, 154 and 156 in the wall of the hub member. Dividing gap 150 is located at a region around hub member 106 between and electrically isolating hub segments 140, 142 from one another at such region. Dividing gaps 152, 154 and 156 are respectively located at regions around the hub member 106 between the inner ends of inductor loop elements 102, 100 and 104, respectively, so as to electrically isolate at such regions the hub segment 140 from segment 144, the hub segment 144 from segment 146, and the hub segment 146 from segment 142. It will be evident, therefore, that electrical current from the power supply 130 fed to inductor loop element 102 by the hub segment 140 then flows in turn through loop elements 102, hub segment 144, loop element 100, hub segment 146, loop element 104, and finally through hub segment 142 back to the power supply 130. Thus, the three inductor loop elements 100, 102 and 104 are electrically connected in series with one another. To reduce overall weight of the inductor C, the hub member 106 thereof is provided with relatively wide radial slots 158 through the hub wall at regions therearound between the respective inductor loop elements 100, 102 and 104 and extending from the top end of the hub member 106 an appreciable distance axially downward thereof but terminating short of the lower end of the hub member so as not to interrupt the continuity of the series circuit connection of the inductor loop elements 100, 102, 104 by the hub member 106.

A plurality of flux intensifier elements or concentrators 160, 162 and 164 are provided immediately contiguous to and located above and below as well as within the space enclosed by each of the inductor loop elements 100, 102 and 104 for the purpose of concentrating the flux field created by these elements, when energized, along and within the various wall surface portions 30a and 32a of the workpiece bore B to aid in assuring adequate inductive heating of these wall portions to proper depth during the passage of the energized inductor and quench head assembly D through the workpiece bore B. These flux intensifiers 160, 162 and 164 are all made of a material of high electrical resistivity such as bonded ferrite or that commercially known as ferrocon.

As best shown in FIG. 9, flux intensifier element 160 is in the form of a relatively thin plate-like member overlying and conforming in outer contour to that of the inductor loop elements 100, 102, 104 and hub member 106 of inductor C and clamped against the upper surface thereof. Thus, the intensifier element 160 is comprised of a split central ring or washer-like portion 168 and three lobe portions 170, 172 and 174 extending radially outward from the ring portion in equally spaced apart relation therearound and formed with an outer contour matching that of the three inductor loop elements 100, 102 and 104, respectively. Ring portion 168 has an outside diameter corresponding to that of the inductor hub portion 106 and is provided with a circular center aperture 176 for snugly receiving the center tube 82 to center the intensifier element 160 on this tube and with respect to the inductor C. Like the hub portion 106 of the inductor C, the ring portion 168 of the flux intensifier 160 is split by a radial slot 178 to provide a dividing gap corresponding to and aligned, around the circumferential extent of the center tube 82, with the dividing gap 150 in the hub member 106 of inductor C so as not to form an electrical short thereacross. To produce increased flux field intensification laterally outward of the arcuate side sections 112, 114 of each of the inductor loop elements 100, 102 and 104 of inductor C, the flux intensifying element 160 is provided with upward thickenings or flat pads 180 extending along and having their outer edges curved to match the arcuate curvature of the arcuately curved outer edges 182, 184 of the respective lobe portions 170, 172 and 173 of the element 160. The thickening pads 180 on each of the lobe portions 170, 172, 174 of flux intensifying element 160 are provided with opposed, spaced, parallel inner edges 186 forming a channelway 188 extending radially of the element.

Figure 5:
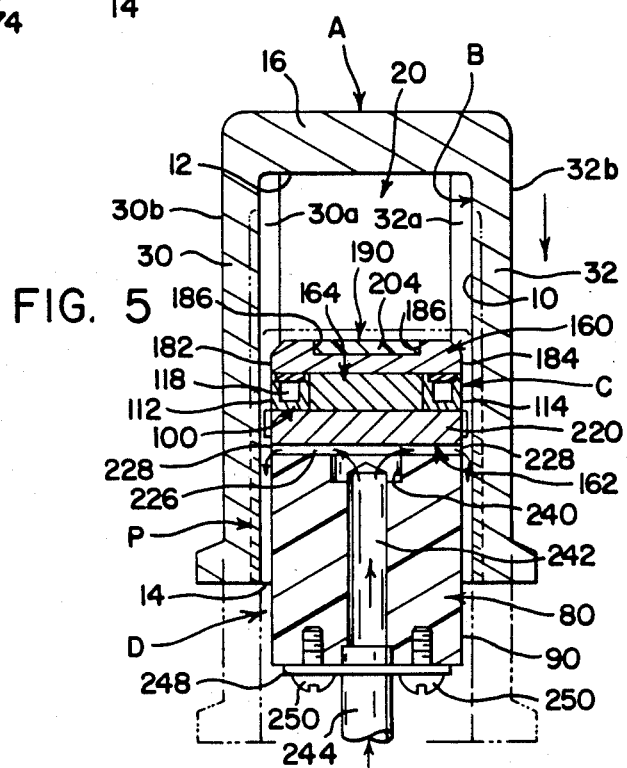
FIG. 5 is a vertical sectional view taken on the line 5—5 of FIG. 4.

The flux intensifying element 160 and inductor loop elements 100, 102, 104 of inductor C are clamped together and secured to the flat upper end 96 of the plastic lower scuff or support cup 80 by an upper scuff or clamp ring 190 of insulating material such as indurated plastic and secured as by flat head nylon fastening bolts 192 threaded into the support cup. For this purpose, the upper scuff ring 190 and the upper flux intensifier element 160 are formed with aligned bolt holes 194 and 196, respectively, through which the fastening bolts 192 extend for threaded attachment to the plastic support cup 80. As best shown in FIG. 9, the upper scuff ring 190 is comprised of a circular ring portion 200 of slightly larger outside diameter than that of the ring portion 168 of flux intensifier element 160 and having a circular center aperture 202 for snugly fitting over and accommodating the center tube 82 to center the scuff ring 190 in place on assembly D, and three orienting wing portions 204, 206 and 208 extending radially outward from the ring portion 200. Wing portions 204, 206 and 208 fit within the channelways 188 on the lobe portions 170, 172 and 174 of the upper flux intensifier element 160 and are each formed with parallel outer side edges 210 adapted to snugly fit between and engage the inner edges 186 of the pads 180 on the flux intensifier element 160 to locate the scuff ring 190 in proper rotative oriented position relative thereto. The scuff ring 190 has a thickness corresponding to the height of the pads 180 on flux intensifier element 160 so that their top surfaces lie flush with one another, as shown in FIGS. 4, 5 and 8.

The internal flux intensifier means 164 is comprised of three separate elements 212 of like semi-circular segmental form and each enclosed within a separate one of the three inductor loop elements 100, 102 and 104. The intensifier elements 212 correspond in outer contour to the inner contour of the inductor loop elements 100, 102, 104 so as to fit snugly therewithin, and they have a thickness somewhat less, e.g., a few thousandths of an inch less, than the height of the inductor loop elements. Each of the intensifier elements 212 is provided with a central bolt receiving aperture 214 for accommodating therein a respective one of the nylon fastening bolts 192. Also, each element 212 is provided with a slot 216 through the thickness thereof and extending radially outward from the bolt receiving aperture 214 to the arcuate outer surface 218 of the element 212 medially of the arcuate extent of such surface. The slots 216 form dividing gaps in the intensifier elements 212 which are vertically aligned with the corresponding dividing gaps 152, 154, 156 in the hub member 106 of inductor C and prevent electrical shorting by the elements 212 of the various inductor loop elements 100, 102, 104 across their innermost ends and shorting of adjacent ones of the arcuate segments 140, 142, 144 and 146 of the hub member 106 which are separated by the dividing gaps 152, 154 and 156.

The lower flux intensifier means 162 is comprised of three separate elongated bar-shaped elements 220 of like form and each mounted on the top end of a respective one of the lobes 90, 92 and 94 of the plastic scuff or support cup 80 in positions extending transversely thereacross and directly underneath the respective inductor loop elements 100, 102, 104 overlying there lobes 90, 92 and 94. The bar-shaped elements 220 are received in and extend longitudinally through channelways 222 extending transversely across the top ends of the respective lobes 90, 92, 94 of the support cup 80, and they are supported with their flat undersides resting on narrow side ledge portions 224 of the channelways 222 to provide, along with the bottom wall and side edges of these channelways, respective transverse shallow passageways 226 (FIGS. 4 and 5) open at their opposite ends 228 for conducting primary quench liquid therethrough and out the discharge ends 228 thereof, as indicated by the arrows in FIG. 7, to impinge against the arcuate surfaces 30a, 32a of the workpiece bore B, after the inductive heating thereof by the energized inductor C, to effect the hardening of these particular bore wall surfaces 30a, 32a. The opposite ends 230 of the bar-shaped intensifier elements 220 are of arcuate contour matching that of the outer side surfaces of the arcuate side sections 112, 114 of the inductor loop elements 100, 102, 104. The intensifier elements 220 are of a thickness such as to position their upper surface flush with the top end surface 96 of the plastic scuff or support cup 80 and thus engage the undersurfaces of the inductor loop elements 100, 102, 104. Each intensifier elements 220 is provided with a slot-shaped recess 232 through the thickness thereof and opening at the inward side edge 234 of the element, for the accommodation therein of the fastening bolts 192.

The liquid quench medium for the primary quench directed out the laterally open discharge ends 228 of passageways 226, for impingement against and quenching of the heated bore wall surfaces 30a, 32a of the respective lobe sections of the workpiece B to effect the hardening of these surfaces, is supplied to the passageways 226 through respective elongated slot-shaped recesses 240 in the plastic scuff cup member 80 located centrally within and opening into the bottom of channelways 222 thereof which form, along with the bar-shaped lower flux intensifier elements 220, the primary quench passageways 226. The slot-shaped recesses 240 communicate through generally vertically extending respective bore passageways 242 (FIG. 4) in the lobe sections 90, 92, 94 of the plastic cup member 80, with primary quench fluid supply or inlet tubes 244 which are preferably made of copper and are connected at their inner ends in liquid tight relation to the lower ends of the bore passageways 242 and at their outer ends to a common supply 246 of primary quench liquid QL(P) suitably controlled so that, selectively, supply 246 can be energized to direct primary quenching liquid through inlet tubes 244, bore passageways 242 and recesses 240, and passageways 226 which have their outlet or discharge end openings 228 facing the various surface portions 30a, 32a of the workpiece bore B. Selective energizing of quench supply 246 to perform the primary quenching operation in accordance with the invention can be by any appropriate control arrangement not forming a part of the present invention, such as a program microprocessor arrangement, for instance. The quench liquid inlet tubes 244 are connected to the plastic support cup 80, in communication with the bore passageways 242 therein, by copper collar members 248 brazed to the respective inlet tubes 244 and secured to the lower end of the support cup 80 as by fastening screws 250.

In addition to being provided with the primary quench arrangement as described above for progressively quenching and hardening the bore wall surface portions 30a, 32a of the workpiece bore B as they become progressively heated to proper quenching temperature and depth by the energized inductor C during the passage of the inductor and quench head assembly D upwardly relative to and within the bore B, the assembly D is also provided in accordance with the invention with a secondary quench arrangement for producing a flood of quench liquid flowing across and overflowing completely around the top end of the assembly D, when in its innermost position in the bore B, for impingement against the innermost end regions of the bore wall surface portions 30a, 32a, after they have become heated to adequate depth by the inductor C, to thereby produce effective quenching and hardening of these innermost regions of the bore wall surface portions 30a, 32a as well. For this purpose, the vertical center post or mandrel 40 and its upward axial post extension 82 are formed, as previously described, of tubular members with aligned bore passageways 48, 86, respectively, which together provide a continuous vertical center bore passageway 260 (FIG. 4) therethrough open at its top end 262 for passage of secondary quench liquid upwardly through this passageway 260 and centrally through the assembly D for discharge out the open top end 262 of the passageway. At its lower end, the bore passageway 260 is connected, as by a conduit or piping 264, to a supply 266 of secondary quench liquid QL(S) suitably controlled so that, selectively, supply 266 can be actuated to direct secondary quenching liquid through conduit 264 and bore passageway 260 out the open upper end 262 of the latter. Selective actuating of quench supply 266 to perform the secondary quenching operation in accordance with the invention can be by any appropriate control arrangement not forming a part of the present invention, such as a program microprocessor arrangement, for example.

In the use of the apparatus described above to perform the method comprising the invention, the workpiece A is supported in a position directly above the inductor and quench head assembly D with their respective axes X and Y disposed vertically and co-aligned, and with the open end 14 of the workpiece facing downwardly. Vertical relative movement of the so positioned workpiece A and inductor assembly D toward one another is then initiated to cause entry and passage of the inductor assembly into and upwardly through substantially the full axial extent of the workpiece bore B to a limiting inward position therein immediately contiguous the closed inner end 12 of the bore, as indicated by the dash-dot outlined position of the workpiece A in FIG. 4. This vertical relative movement of the workpiece and inductor assembly D toward one another may be effected by holding the inductor assembly stationary, i.e., in a fixed position as shown, and moving the workpiece axially downward with respect to the inductor assembly. If desired, however, the workpiece A could be held stationary and the inductor assembly D instead moved vertically upward for passage into and through the workpiece bore B. In the particular case illustrated, however, the workpiece A is supported and secured in place, in the aforementioned open end down position, in a holder means comprising a vertically movable platform 270 as by means of spring clamps (not shown) which are pressed downwardly against the upper end wall 16 of the workpiece, as indicated by the arrows F in FIG. 1. Platform 270 has a circular aperture 272 therein of somewhat smaller diameter than the circular outside peripheral edge 274 (FIG. 6) of the lower end wall 276 of the workpiece so as to provide a seat for the workpiece. The aperture 272, however, has a radius, centered on the axis Y of the inductor assembly D, which is slightly larger than the radii, centered on the workpiece axis X, of the arcuate inner surfaces 34a of the lobe sections 20, 22, 24 of the workpiece bore B so as to permit the passage of the inductor assembly D through the aperture 272. The workpiece A is clamped in seated position within a counterbore 278 in aperture 272 for centering and locating the workpiece in axially aligned relation with respect to the inductor assembly D and platform 270 which are aligned in a vertical direction.

In the illustrated embodiment, wherein the workpiece A is moved downwardly over the inductor and quench head assembly D to effect the passage of this assembly upwardly into the workpiece bore B, the platform 270 on which the workpiece is supported is vertically reciprocated, to provide the vertical relative movement between the inductor assembly and workpiece, by a reversible drive mechanism 280. As shown in FIG. 1, this drive mechanism employs an electric motor 282 for driving a pinion 284 which is coupled or gear meshed with a rack 286. The rack is coupled to the platform 270 so that the platform, together with the workpiece A supported thereon, is reciprocated vertically within a guide bore 288. As an alternative, the platform 270 and workpiece A could remain stationary and the inductor assembly D instead reciprocated by the rack 286.

If desired, quenching liquid QL(E) from an appropriate pressurized source 290 may be directed against the external surfaces of the workpiece walls 30, 32 and 34 for the purpose of maintaining these walls cooled during the processing of the workpiece A in accordance with the invention. The quench liquid from source 290 is supplied through conduit 292 to a hollow quench ring 294 upstanding from platform 270 and having an inner cylindrical surface 296 surrounding and facing workpiece A on platform 270. The ring 294 is provided with a plurality of somewhat downwardly inclined orifices 298 communicating with the hollow interior 300 of the ring for discharging downwardly angled jets of quench fluid against the outer surfaces of the workpiece walls 30, 32, 34. Drain openings 302 in platform 270 provide for drainage and escape of quenching liquid discharged from the ring orifices 298.

To produce the hardness patterns P within and along substantially the full axial extent of the bore wall surface portions 30a, 32a of the closed end workpiece bore B by the apparatus comprising the invention, the workpiece A, after having been mounted in place on the support platform 270 with its open bore end 14 facing down, is moved slowly downward at a rate of around 0.375 to 0.55 inches per second for example, relative to and over the inductor assembly D, by actuation of the drive assembly 280. The inductor C thereby scans the bore wall surfaces 30a, 32a upwardly from the open lower end 14 of the bore to a region closely adjacent the innermost closed end of the bore, as determined by the limiting insertable position of the inductor assembly D into the bore B as limited by the closed end 12 thereof. While this upward scanning of the bore wall surface portions 30a, 32a by the inductor C is taking place, the power supply 130 is energized by actuation from an appropriate control, schematically illustrated as control 310 having a start command input 312 and a control timer 314. After a start of cycle command is received, timer 314 then controls a full operating cycle of the apparatus comprising the invention in accordance with standard control technology. This does not form a part of the present invention. The energization of the H.F. power supply 130 by control 310 produces a desired, selectable power level across the leads 132, 134 serving to energize the inductor C to initiate the inductive heating of the bore wall surface portions 30a, 32a to proper quenching temperature and depth progressively upward from the open lower end 14 of the workpiece bore B as the workpiece A is moved downwardly over and around the inductor assembly D by the drive mechanism 280 to effect the upward scanning of the bore wall surface portions by the inductor.

When, during the course of the downward movement of the workpiece A, the lowermost end 14 thereof comes abreast of and is located at the level of or slightly below the common plane of the primary quench discharge openings 228 in the inductor assembly D, the supply 246 of primary quench fluid QL(P) is then actuated to continuously direct this quench liquid through the respective tubes 244 to their communicating passageways 242, 240 and 226 in the inductor assembly D and thence out the laterally outward facing end discharge openings 228 of passageways 226. This outwardly discharged primary quench liquid QL(P) from the openings 228 then impinges against and progressively quench cools the wall surface portions 30a, 32a immediately as they are progressively heated by the energized loop elements 100, 102, 104 of the inductor, thereby progressively effecting the hardening of these wall surface portions so as to form the hardness pattern P therein.

Because of the location of the inductor loop elements 100, 102, 104 of the inductor assembly D at a level a slight distance below the top end thereof, and also because of the location of the primary quench discharge openings 228 in a common plane at a level slightly below the common plane of the various inductor loop elements 100, 102, 104 and thus at a further distance than these loop elements below the top end of the inductor assembly D, the primary quench liquid discharged from the discharge openings 228 when the inductor assembly D reaches the uppermost limit of its passage into the bore B, as determined by the nearly engaged position of the assembly D with the closed end 12 of the bore, therefore does not reach and impinge against the heated innermost end portions of the bore surfaces 30a, 32a which are located above and beyond the reach of the discharged primary quench liquid from openings 228. As a consequence, a substantial axial extent of the bore wall surface portions 30a, 32a at their innermost ends is not quenched and hardened by the primary quench liquid discharged from the openings 228, thereby preventing the formation of a uniform hardening pattern P throughout substantially the full axial extent of the surface portions 30a, 32a.

The above described problem is effectively overcome with the apparatus according to the invention by providing a secondary quench of the bore wall surfaces 30a, 32a which is discharged from and overflows completely around the top end of the inductor assembly D, when in its limiting innermost position within the workpiece bore B, and impinges against and flows down along the heated innermost end regions of the bore wall surface portions 30a, 32a to effectively quench and harden them. The quench liquid for this secondary quench operation is supplied from the source 266 thereof which is energized by the control 310, after th inductor reaches and while it is maintained in its limiting innermost position within the bore B, to direct the secondary quench liquid QL(S) through conduit 264 and the connecting axial bore passageway 260 of the inductor assembly D out the open upper end 262 thereof. The discharged secondary quench liquid then impinges against the closed end 12 of the workpiece bore B, which at such time is closely adjacent or contiguous the top end of the inductor assembly D as indicated in dash-dot lines in FIG. 4, to deflect and redirect the discharged secondary quench liquid laterally outward over the top end of the inductor assembly as indicated by the arrows 320 in FIG. 4 to create, in essence, a flood of the secondary quench liquid overflowing the top end of the assembly D completely therearound and impinging against and flowing down along the heated innermost end regions of the surface portions 30a, 32a of the bore wall 10 through the peripheral clearance space between the assembly D and the bore wall. This flood of secondary quench liquid outwardly overflowing the top end of the assembly D thus effectively quenches and hardens the innermost end regions of the bore wall surface portions 30a, 32a which are located above the inductor loop elements 100, 102, 104 when the inductor assembly D reaches its limiting innermost position within the bore B during the course of its passage upwardly therethrough. The combination of the secondary quench from the top discharge opening 262 with the primary quench from the laterally outward directed lower discharge openings 228 thus assures the formation of an approximately uniform hardening pattern P throughout substantially the full axial extent of the bore wall surface portions 30a, 32a from the open end 14 of the bore B right up to the closed end 12 thereof.

Simultaneously with the initiation of the secondary quench as described above, the inductor C is de-energized by the control 310 to terminate the inductive heating of the bore wall surface portions 30a, 32a by the inductor. This de-energization of the inductor C and concurrent start of the secondary quench from the top opening 262 of assembly D, however, preferably occurs only after a momentary time delay after the inductor assembly first reaches and is stationed in its limiting innermost position within the workpiece bore B at the end of its passage inwardly thereinto. This time delay is effected by the operation of the control 310 that controls the energization and de-energization of the inductor C and the start and discontinuance of the primary quench from openings 228 and the secondary quench from the top opening 262. The provision of this momentary time delay and continuance of the energization of the inductor C and inductive heating of the bore wall surface portions 30a, 32a after the inductor assembly D first reaches its limiting innermost position within the bore B thus assures the obtaining of adequate heated depth of the innermost end regions of the surface portions 30a, 32a before the start of secondary quenching thereof, such as is necessary to produce a hardening pattern for these innermost end regions which is of uniform character with that of the rest of the axial extent of these surface portions. The momentary continuance of the inductive heating of the innermost end portions of the bore wall surface portions 30a, 32a is necessitated mainly by the heat sink effect of the mass of the closed end wall 16 of the workpiece A which is immediately contiguous to and acts to withdraw heat from the innermost end regions of the bore wall surface portions 30a, 32a during the inductive heating thereof by the inductor C.

From the above description of the invention, it will be evident that an apparatus is provided emminently suitable for the production of substantially uniform hardening patterns in the wall surface of a workpiece bore having a closed end, which hardening patterns extend substantially the full axial length of the bore from the open end thereof to the closed end. The apparatus herein disclosed for such purpose can be applied to the hardening of the wall of a cylindrical hole or bore in a workpiece, which may or may not require relative rotation between the workpiece and the inductive heating element. The disclosed apparatus also can be used to harden the wall surfaces of one or more, or a series of, convoluted internal areas in workpieces such as used in the tripot joint of front wheel drives for automotive vehicles, as illustrated herein.

The invention has been described with reference to the preferred embodiment thereof. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. An inductor and quench head device for inductively heating and quench hardening the wall surface of an elongated bore of uniform selected cross-sectional shape throughout the axial extent thereof and extending axially within a metal workpiece and having an open end and a closed opposite end, said device comprising an insulating support member for passage upwardly into and axially of said bore, an inductor mounted on said support member adjacent the upper end thereof and comprising inductor element means having an outer shape generally matching the cross-sectional shape of said bore for inductively coupling with the wall surface thereof on the said passage of the support member and associated inductor upwardly into the bore, said device having primary quench outlet means located below and facing laterally outward of said inductor element means and secondary quench outlet means located above said inductor element means, and control means for initiating the supply of quench liquid to said secondary quench outlet means only after the said inductor, on its said upward passage into said bore, reaches its limiting innermost position therewithin.

2. The device as defined in claim 1, wherein the said device is provided with a horizontally disposed substantially flat top end surface and includes tubular means extending vertically through said support member and terminating at the said top end surface of the device, said tubular means providing a secondary quench passageway extending vertically through said support member and open at the said top end surface of the device to form said secondary quench outlet means.

3. The device as defined in claim 2, wherein the said tubular means and the said secondary quench passageway provided thereby extend axially of and centrally through said support member.

4. The device as defined in claim 3 for quench hardening the opposite side wall portions of respective lobe portions of a multi-lobed bore of uniform cross-sectional shape throughout the axial extent thereof and extending axially within a workpiece and having an open end and a closed opposite end, wherein the said device, including the said inductor element means of the said inductor thereof, is of multi-lobed outer shape generally matching the said multi-lobed cross-sectional shape of said bore and wherein each respective lobe portion of said device is provided with a pair of primary quench outlets located below said inductor element means and facing laterally outward from the opposite sides of the respective lobe portions of said device.

5. The device as defined in claim 1, for quench hardening the opposite side wall portions of respective lobe portions of a multi-lobed bore of uniform cross-sectional shape throughout the axial extent thereof and extending axially within a workpiece and having an open end and a closed opposite end, wherein the said device, including the said inductor element means of the said inductor thereof, is of multi-lobed outer shape generally matching the said multi-lobed cross-sectional shape of said bore and wherein each respective lobe portion of said device is provided with a pair of primary quench outlets located below said inductor element means and facing laterally outward from the opposite sides of the respective lobe portions of said device, the said device further comprising a vertically extending tubular support post having an upwardly extending reduced diameter center tube extension projecting from the upper end and axially of the said post, said support post and center tube extension having a continuous vertical bore passageway open at the top end thereof to form the said secondary quench outlet means, said support member having a vertical center bore and being seated on the upper end of said support post with the said center tube extension thereof extending upwardly through and fitted within the said center bore of the support member to center the latter on the center tube extension, and said inductor having the said multi-lobed shape inductor elements means thereof comprised of respective hollow loops extending laterally outward from the upper end of a multiple axial split hub portion of the inductor extending downwardly into and fitted within a counterbore in the support member and around the said center tube extension to center the inductor thereon, the individual split hub sections of said inductor hub portion constituting electrical conductors joining the said inductor loops together into a unitary structure and interconnecting them in a series circuit, said inductor hub sections being provided with internal passageways communicating with the hollow interiors of the said inductor loops for circulating cooling liquid therethrough.

6. The device as defined in claim 5, wherein the said support member is provided with a plurality of shallow transverse channelways open at the opposite sides of the respective said lobe portions of the device to form the said primary quench outlets of the device, said channelways communicating with respective primary quench liquid bore passageways extending downwardly through said support member for supplying primary quench liquid to the said primary quench outlets.

7. The device as defined in claim 5, wherein flux intensifier elements are mounted on the said device in positions respectively overlying, underlying, and within the enclosed interior space of the respective said inductor loops.

8. The device as defined in claim 5, wherein an insulative protective top cover plate ring of multi-lobed shape is mounted on the top end of said support member and fitted over the upper end of said center tube extension to overlie and shield the said inductor from the said secondary quench liquid discharged from the open top end of the said axial bore passageway of said center tube extension and flowing over the top of the device.

9. Apparatus for quench hardening to a selected depth the wall surface of an axially extending bore in an elongated metal workpiece, which bore has a uniform cross-sectional shape throughout the axial extent thereof and has an open end and a closed opposite end, said apparatus comprising:

(a) holder means for supporting said workpiece with the axis of said bore extending vertically and the said open end of the bore facing downward;

(b) an inductor assembly mounted below said holder means and supported workpiece in axial alignment with and passable through the said bore thereof, said inductor assembly including an inductor comprising inductor element means with an outer shape generally matching, but smaller than, said cross-sectional shape of said bore;

(c) drive means for establishing relative vertical movement at a selected rate between said workpiece and inductor assembly to effect passage of said assembly upwardly into the open lower end of and through said bore to a limiting innermost portion therein contiguous the said closed end of the bore;

(d) means for continuously energizing said inductor with a known frequency and a selected power level during the said passage thereof upwardly through said bore whereby to progressively inductively heat the said bore wall surface to a selected depth;

(e) primary quench means associated with said inductor assembly and including primary quench outlet means in said assembly at a location below the said inductor element means thereof for directing primary quench liquid progressively against the said progressively heated bore wall surface to progressively quench harden said wall surface upwardly therealong; and, (f) secondary quench means associated with said inductor assembly and including secondary quench outlet means in said assembly at a location above the said inductor element means thereof for discharging secondary quench liquid from said assembly, after reaching and while stationed at its said limiting innermost position within said bore, for impingement against and quench hardening of the innermost end regions of said heated bore wall surface.

10. Apparatus as defined in claim 9, wherein the said energizing means for said inductor is deactivated and the said inductor de-energized after the said inductor assembly reaches and is stationed in its said limiting innermost position within the said bore but before the initiation of the said discharge of secondary quench liquid from said secondary quench outlet means.

11. Apparatus as defined in claim 9, wherein the said secondary quench means is actuated only following a momentary time delay interval after said inductor assembly first reaches and is stationed at the said limiting innermost position thereof within the said bore while the said inductor remains energized during said time delay interval.

12. Apparatus as defined in claim 9, wherein the said secondary quench means comprises a secondary quench outlet in said inductor assembly opening outwardly at the top thereof.

13. Apparatus as defined in claim 9, wherein the said secondary quench means comprises a center bore passageway extending axially through said inductor assembly and open at its upper end for conducting the said secondary quench liquid through said assembly and discharging it centrally out of the top end thereof.

14. Apparatus as defined in claim 13 for quench hardening the opposite side wall portions of respective lobe portions of a multi-lobed bore of uniform cross-sectional shape throughout the axial extent thereof and extending axially within a workpiece and having an open end and a closed opposite end, wherein the said inductor assembly, including the said inductor element means of the said inductor thereof, is of multi-lobed outer shape generally matching the said multi-lobed cross-sectional shape of said bore and wherein each respective lobe portion of said assembly is provided with a pair of primary quench outlets located below said inductor element means and facing laterally outward from the opposite sides of the respective lobe portions of said assembly.

15. An inductor and quench head device for inductively heating and quench hardening the wall surface of an elongated bore of uniform selected cross-sectional shape throughout the axial extent thereof and extending axially within a metal workpiece and having an open end and a closed end, said device comprising a vertically extending tubular support post having an upwardly extending reduced diameter center tube extension projecting endwise from the upper end and axially of the said post, said support post and center tube extension having an axially extending vertical center bore passageway open at the top end thereof for conducting a secondary quench liquid therethrough and outwardly from said open top end, an indurated plastic support cup member seated on the upper end of said support post and fitted over the said center tube extension to axially center the said cup member thereon, an inductor comprising hollow inductor element means of loop shaped form extending laterally outward of, and seated on and clamped against the upper end of said cup member in position to inductively couple with the said wall surface of the workpiece bore on passage of the device axially thereinto, a pair of tubular electrical conductors extending through said cup member and electrically connected to the opposite ends of the said loop shaped inductor element means, with the hollow interiors of said conductors respectively communicating with opposite ends of the hollow interior of said inductor element means, for supplying an electrical energizing current thereto and circulating a cooling liquid therethrough, and said device having transverse channelway means located within the upper end portion of said cup member but below the said inductor element means of the inductor and open at the side of the cup member for directing primary quench liquid laterally outward therefrom.

16. The device as defined in claim 15, wherein the said support cup member is provided with a primary quench liquid bore passageway extending generally vertically through said support cup member and communicating at its upper end with the said transverse channelway means thereof, and a supply tube secured to the lower end of said support cup member and communicating with the lower end of said primary quench liquid bore passageway for supplying primary quench liquid to said transverse channelway means.

17. The device as defined in claim 15, wherein the said inductor further includes a pair of electrical conductor portions extending from respective ends of sid loop shaped inductor element means downwardly into a vertically extending internal passage in said cup member located alongside the said center tube extension, said conductor portions of the inductor being electrically connected at their lower ends to respective ones of said tubular electrical conductors and having respective vertical bore passageways therethrough communicating at their upper ends with the respective ends of the interior passageway of said loop shaped inductor element means and communicating at their lower ends with the interior of the said respective ones of said tubular electrical conductors.

18. The device as defined in claim 17, wherein the said support cup member is provided with a primary quench liquid bore passageway extending generally vertically through said support cup member and communicating at its upper end with the said transverse channelway means thereof, and a supply tube secured to the lower end of said support cup member and communicating with the lower end of said primary quench liquid bore passageway for supplying primary quench liquid to said transverse channelway means.

19. The device as defined in claim 15, and including a thin top clamp ring of indurated plastic fitted over the upper end of said center tube extension, said clamp ring overlying the said loop shaped inductor element means and clamping the said inductor to the upper end of the said support cup member.

20. The device as defined in claim 19, wherein an upper plate-shaped flux intensifier element is fitted over the upper end of said center tube extension, said upper flux intensifier element overlying the said loop-shaped inductor element means and being interposed between said clamp ring and said inductor element means and clamped thereagainst by said clamp ring.

* * * * *